Jan. 2, 1923.                                                    1,440,778
W. L. FOSTER.
WATER INDICATOR FOR OIL WELLS.
FILED MAY 21, 1921.                         3 SHEETS-SHEET 1
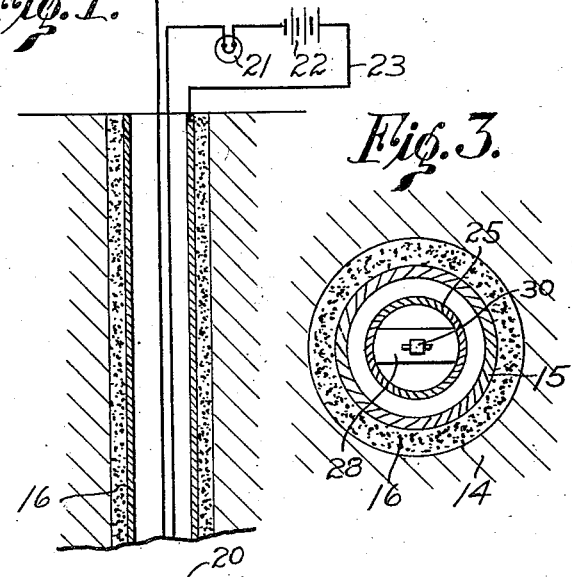
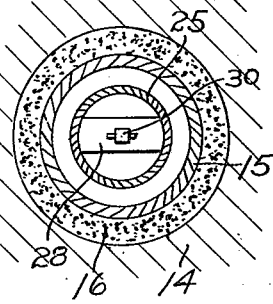
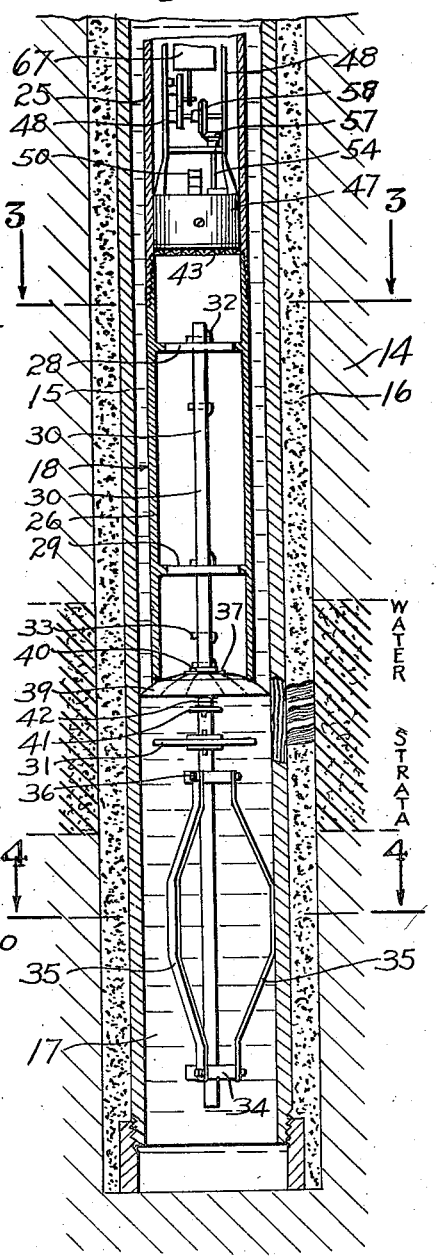
INVENTOR.
Walter L. Foster
BY Westall and Wallace
ATTORNEYS.

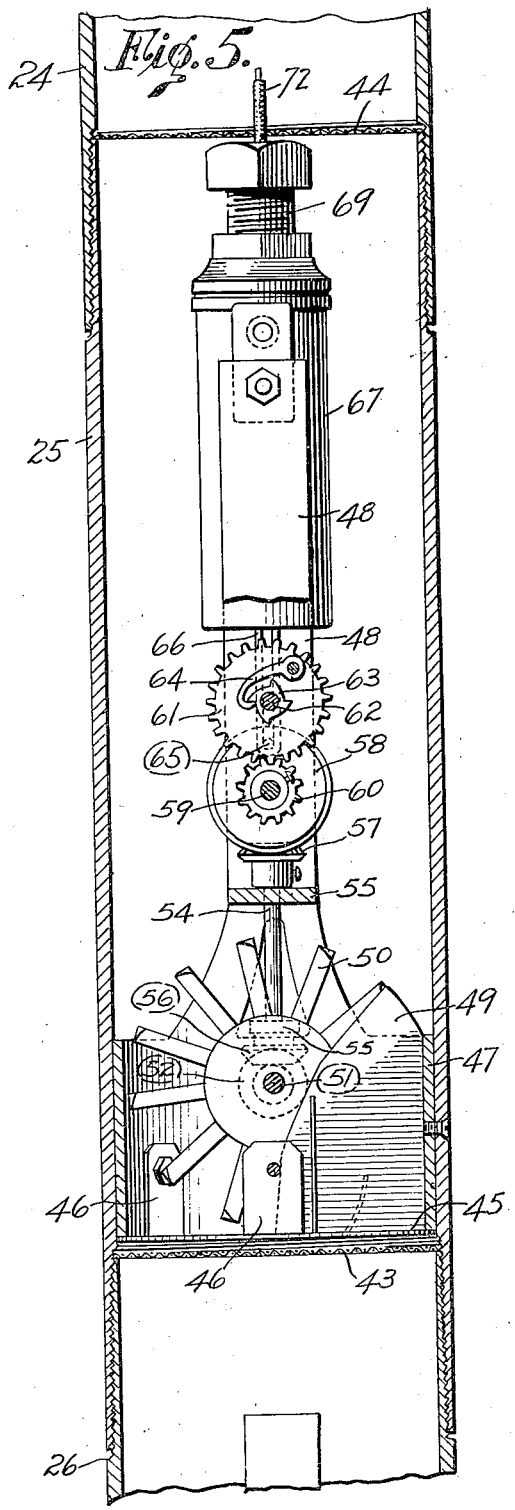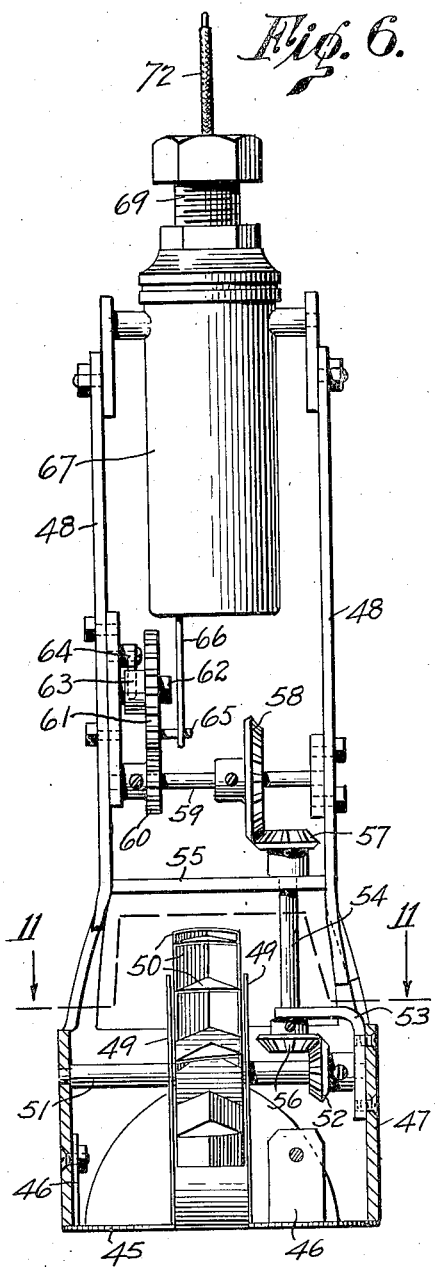

Jan. 2, 1923.
W. L. FOSTER.
WATER INDICATOR FOR OIL WELLS.
FILED MAY 21, 1921.
1,440,778
3 SHEETS-SHEET 3
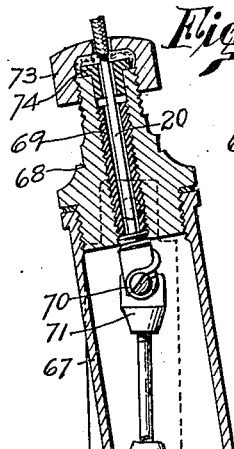
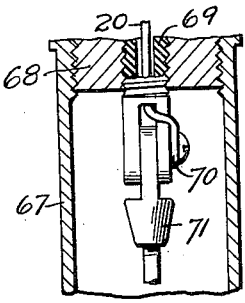
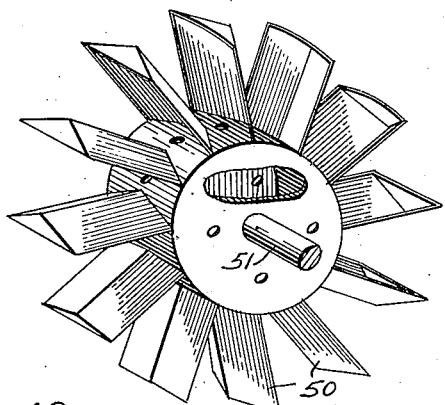
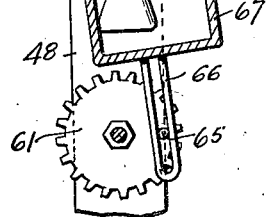
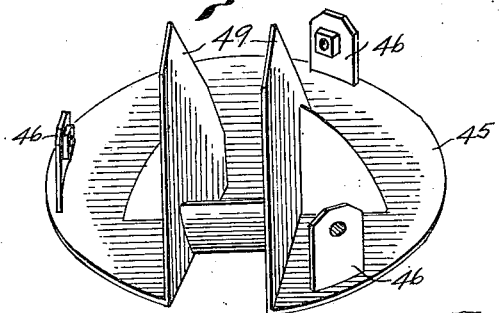
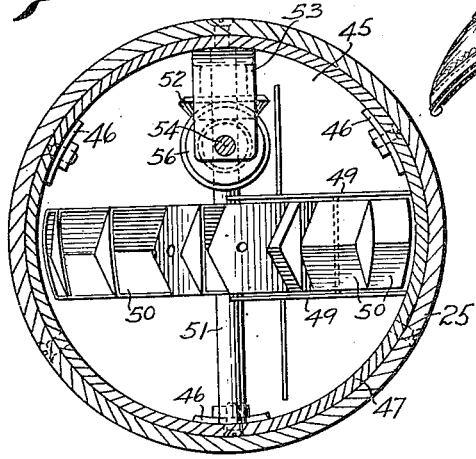
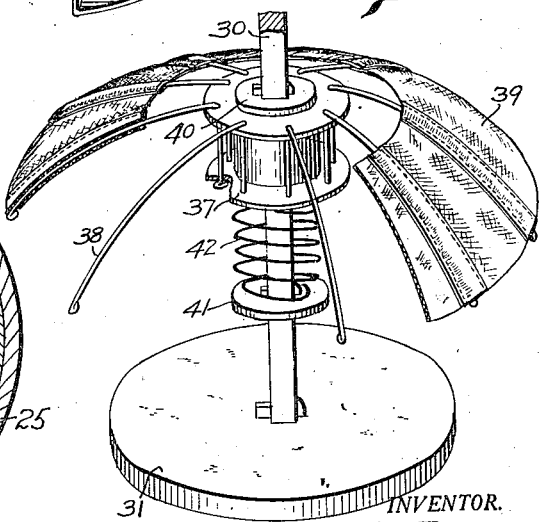
INVENTOR.
Walter L. Foster
BY Nestall and Wallace
ATTORNEYS.

Patented Jan. 2, 1923.

1,440,778

UNITED STATES PATENT OFFICE.

WALTER L. FOSTER, OF WHITTIER, CALIFORNIA.

WATER INDICATOR FOR OIL WELLS.

Application filed May 21, 1921. Serial No. 471,387.

*To all whom it may concern:*

Be it known that I, WALTER L. FOSTER, a citizen of the United States, residing at Whittier, in the county of Los Angeles and State of California, have invented new and useful Improvements in a Water Indicator for Oil Wells, of which the following is a specification.

This invention relates to an instrument to locate the level at which water flows into a well hole, and is especially adapted for use with oil wells.

One of the serious difficulties experienced in the flow of water into the well hole. It is common practice to drill well holes, place tubular casing therein extending to the oil strata and to place cement about the casing in order to prevent water from flowing from the water strata into the hole, mixing with the oil being pumped, or entering the oil strata. However in spite of these precautions, water often enters the casing, due to various causes, such for illustration, as a split in the casing. As wells of this character are deep and the water pressure is usually sufficient to force the water into the casing to a level close to the surface, it is difficult to locate the point of water inflow. If the water inflow can be located, the leakage can be readily stopped.

It is the primary object of this invention to provide an instrument for locating the water inflow. Other objects are to provide details of structure whereby an easily manipulated and positively acting device may be obtained.

These objects together with other objects and corresponding accomplishments are obtained by means of the embodiment of my invention illustrated in the accompanying drawings, in which:

Fig. 1 is a vertical section through a well showing my indicator in position at the bottom thereof, the indicator being shown partially in section; Fig. 2 is an enlarged section similar to Fig. 1, with the indicator raised above the bottom of the well; Fig. 3 is a section taken on the line 3—3 of Fig. 2; Fig. 4 is a section taken on the line 4—4 of Fig. 2; Fig. 5 is an enlarged section partly in elevation of a fragment of the indicator; Fig. 6 is an elevation taken at right angles to Fig. 5 showing the current motor and make and break mechanism; Fig. 7 is a section through the make and break showing the pendulum making contact; Fig. 8 is an enlarged section of a fragment of the make and break taken at right angles to the section shown in Fig. 7; Fig. 9 is a perspective view of the motor wheel; Fig. 10 is a perspective view of the base plate for the current motor; Fig. 11 is a section taken on the line 11—11 of Fig. 6; and Fig. 12 is a perspective view of the packing.

Referring more particularly to Figs. 1 to 4 inclusive, a well hole is shown therein, the earth being indicated by 14. A well casing of the usual type is indicated by 15. The hole is cemented by cement 16. This is the usual construction in oil wells. Water is indicated by 17, this being at the bottom of the well. The indicator is marked 18 and is suspended by a cable 19. Extending to the surface is an electric wire 20 which is connected to a signal lamp 21. A source of electric energy is indicated by 22. This source for the purpose of illustration is shown as being a battery, whereas in actual practice, it may be found advisable to connect the circuit to the usual electric light system. The other side of the battery is connected by a wire 23 to the casing so that the latter is grounded. It is obvious that by means of the cable 19 the indicator may be raised and lowered.

Referring more particularly to the details of the indicator shown herein, the mechanism is housed in a tubular casing consisting of three sections 24, 25, and 26. These sections are secured to each other by threads, the section 24 has a bail 27 secured to the top thereof for attachment of the cable 19. Mounted in the bottom section 26 are cross pieces 28 and 29 serving as supports for a rod 30, to which the packing mechanism is secured. Referring particularly to Figs. 1, 2, 4, and 12, a closure disk 31 is shown secured to the rod 30. It will be noted from an inspection of Fig. 2 that rod 30 has a sliding movement in the cross pieces, this movement being limited by keys 32 and 33. When key 32 abuts cross piece 28, the rod 30 is in its lower position. When key 33 abuts cross piece 29, the rod 30 is in its upper position. The rod extends below the housing and has secured thereto a collar 34 to which spring bows 35 are attached. The upper ends of the bows are secured to a slidable collar 36 and are so sprung as to engage the casing. When the indicator is placed in the well casing, the bows 35 engage the sides thereof, and as the indicator is lowered, rod 30 is moved upwardly so as to bring the closure disk 31 against the bottom of the housing and prevent water or liquid from flowing therethrough. Slidably mounted upon the rod 30 is a spool 37 having extending therefrom wire ribs 38 of umbrella form. Stretched over the ribs is a packing sheet 39 having a water opening at the center. The movement of the spool 37 upon the rod 30 is limited by washers 40 and 41. A spring 42 is interposed between the spool and the lower washer 41. It tends to hold the spool in its upper position. When the rod 30 is moved upwardly in the housing, the ribs are contracted and the packing sheet pulled into the housing as indicated in Fig. 1. When the rod is in its lower position, the ribs are so disposed that they may expand and the packing is in the position shown in Fig. 2, such that it may engage the well casing. When the indicator is lowered in the well casing, the spring bows 35 engage the casing and force rod 30 upwardly so that the packing is disposed within the housing and disk 31 closes the bore. In this condition, water cannot pass through the housing but may pass around the edge. When the indicator is lifted, the bows 35 drag upon the well casing, pulling rod 30 outwardly and allowing the packing to expand closing off the flow of water about the edge of the housing but permitting water to flow through the center thereof as will be better understood from an inspection of Fig. 12. It will also be noted that water can flow downwardly as the ribs may be forced downwardly and inwardly.

The section 25 of the housing encloses the current motor mechanism, and interposed between it and section 26 is a screen 43 (see Fig. 5). A similar screen 44 is interposed between sections 24 and 25. These screens are for the purpose of preventing the entrance of sand or detritus into section 25 of the housing. Above screen 43 is the motor base 45. This base consists of a plate having upstanding therefrom ears 46. The base is secured to a frame comprising a cylindrical portion 47 and side standards 48. Bordering an opening in the base 45 are guards 49 for the motor wheel. This motor wheel is indicated by 50 and comprises buckets adapted to run between the guards 49 to receive water passing through the opening in the base plate. The buckets are so arranged that flow of water upwardly will rotate the wheel which is mounted upon a shaft 51 journalled in the cylindrical portion of the frame 47. Mounted upon the shaft 51 is a bevel gear 52. Mounted upon the frame is a bearing bracket 53, in which shaft 54 is journalled, the other end thereof being journalled in a cross piece 55. The lower end of shaft 54 has a bevel gear 56 meshing with bevel gear 52. The upper end of the shaft has a bevel gear 57 meshing with a gear 58 mounted upon a shaft 59 and having a pinion 60 secured thereto. Pinion 60 meshes with a gear 61. Gear 61 is journalled on a pintle 62 and has secured thereto a ratchet wheel 63. Engaging ratchet wheel 63 is a pawl 64, which prevents rotation of the gear 61 except in one direction. By this means the gearing between gear 61 and the current wheel 50 is locked, so that the latter can only rotate by reason of water flowing upwardly through the housing. Mounted upon gear 61 is a crank pin 65. Pin 65 is disposed in the slot of a crank 66, which is secured to the bottom of a case 67. The case is tubular in form and closed at the lower end. In the upper end thereof is a plug 68, and extending therethrough is an insulator tube 69 to accommodate the electric wire 20. The lower end of the tube is bifurcated and has a pivot pin 70 mounted therein. Suspended upon pivot pin 70 is a pendulum 71 of conducting material. The electric conductor 20 is connected to the pivot pin 70 so that the pendulum 71 is electrically connected to the wire. The upper end of plug 68 is threaded, and mounted thereon is a cap 73. A packing gland 74 is mounted in the bore of plug 68, thereby providing a liquid seal for the electric wire 20.

Rotation of gear 61 will cause oscillation of the case 67, and bring pendulum 71 in contact with the case. Case 67 is mounted upon trunnions journalled in the standards 48, the case being an electrical conductor, and the standard as well as the tubing sections being of electric conducting material. Due to the fact that the well casing forms a ground for the electric circuit, oscillation of the case 67 will cause the pendulum intermittently contact with the case and thereby make and break the electrical circuit causing a flashing of lamp 21.

Suppose that water trouble is experienced in a well, and it is desired to locate the point at which water flows into the hole. The indicator 18 is lowered to the bottom of the well as shown in Fig. 1. As the indicator is lowered in the well, bows 35 will engage the casing, forcing the packing 39 into the housing and closure disk 31 against the bottom thereof, thereby preventing water from flowing through the housing. Water is now bailed or pumped from the well hole, so that its level is lowered. This will cause an inflow of water into the hole. There will be a current of water flowing above the point at which water enters the hole, while the water below the point of inflow will be dead. The indicator is now slowly raised, the bows 35 dragging upon the casing and pulling the closure disk from the housing, and permitting the packing 39 to expand so as to prevent the flow of water upwardly between the housing and the well casing. The parts are now in the position shown in Fig. 2. When the packing reaches a point just about the place at which the water flows into the well, such a place being indicated in Fig. 2, water will begin to flow upwardly through the housing and will rotate the current wheel 50. This causes an oscillation of the case 67, an intermittent contact of the pendulum 71 therewith. The result is an intermittent make and break of the electrical circuit and a flashing of the lamp at the surface. When this occurs, the operator knows that the indicator is at the point of water inflow. The length of cable which has been paid out is a measure of the distance from the surface at which the leak occurs. With this information the leak can be remedied in a manner well known to oil well drillers. It is obvious that the indicator may be lowered and raised a slight amount after flashing of the lamp occurs, in order to accurately determine the point at which water flows into the well hole.

It is also obvious that my invention is not limited to the particular type of current motor shown herein, nor to the particular elements of the electrical system. Furthermore it will be possible to use a mechanical signal system, and even a meter to determine the amount of water flowing. The latter information may be valuable in certain instances. Various mechanical changes may be made without departing from the spirit of my invention.

What I claim is:

1. A device of the character described comprising a housing, packing means on said housing adapted to engage the wall of a well casing and to prevent flow of water upwardly about said housing, there being a passage extending through said housing and said packing to permit flow of water through said housing, a current motor in said housing operable by the flow of water therethrough, and indicating means actuated by said motor.

2. A device of the character described comprising a housing, packing means on said housing adapted to engage the wall of a well casing and to prevent flow of water upwardly about said housing, there being a passage extending through said housing and said packing to permit flow of water through said housing, a current motor in said housing operable by the flow of water therethrough; and an electric circuit including current control means intermittently operated by said motor and a signal respondent to the current.

3. A device of the character described comprising a housing, packing means on said housing adapted to engage the wall of a well casing and prevent flow of water upwardly about said housing, there being a passage extending through said housing and said packing to permit flow of water through said housing, a current motor in said housing operable by the flow of water therethrough; and an electric circuit including a signal and a make and break device operated by said motor.

4. A device of the character described comprising a housing, packing means on said housing adapted to engage the wall of a well casing and prevent flow of water upwardly about said housing, there being a passage extending through said housing and said packing to permit flow of water through said housing, a current motor in said housing operable by the flow of water therethrough; and an electric circuit including a signal and a make and break device intermittently operated by said motor.

5. A device of the character described comprising a housing, packing means on said housing adapted to engage the wall of a well casing and prevent flow of water upwardly about said housing, there being a passage extending through said housing and said packing to permit flow of water through said housing, a current motor in said housing operable by the flow of water therethrough; an electric circuit including a signal, an oscillatable case actuated by said motor, and a pendulum in said case for intermittent contact with the former and forming a make and break.

6. A device of the character described comprising a housing, one direction packing means on said housing adapted to engage the wall of a well casing and prevent flow of water upwardly above said housing, there being a passage extending through said housing and said packing to permit flow of water through said housing, a current motor in said housing operable by the flow of water therethrough in one direction, and signal means actuated by said motor.

7. A device of the character described comprising a housing, collapsible packing means on said housing adapted to engage the wall of a well casing and to prevent the flow of water upwardly about said casing, means normally tending to collapse said packing, casing engaging means to expand said packing, there being a passage extending through said housing and said packing to permit the flow of water through said housing, a current motor in said housing operable by the flow of water therethrough, and signal means actuated by said motor.

In witness that I claim the foregoing I have hereunto subscribed my name this 9th day of May 1921.

WALTER L. FOSTER.